US012687870B2

(12) United States Patent
Tsuda et al.

(10) Patent No.: US 12,687,870 B2
(45) Date of Patent: Jul. 21, 2026

(54) REGULATOR CIRCUIT FOR ACCEPTING RANGE OF INPUT VOLTAGES WHILE ACHIEVING LOWER POWER CONSUMPTION

(71) Applicant: Renesas Electronics Corporation, Tokyo (JP)

(72) Inventors: Atsushi Tsuda, Tokyo (JP); Kosuke Yayama, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 190 days.

(21) Appl. No.: 18/588,650

(22) Filed: Feb. 27, 2024

(65) Prior Publication Data

US 2024/0310863 A1 Sep. 19, 2024

(30) Foreign Application Priority Data

Mar. 17, 2023 (JP) ................................ 2023-042572

(51) Int. Cl.
*G05F 1/56* (2006.01)
*G05F 1/46* (2006.01)
*G05F 1/565* (2006.01)

(52) U.S. Cl.
CPC .............. *G05F 1/565* (2013.01); *G05F 1/468* (2013.01)

(58) Field of Classification Search
CPC .......... G05F 1/565; G05F 1/468; G05F 1/575; G05F 1/56; G05F 1/461
See application file for complete search history.

(56) References Cited

U.S. PATENT DOCUMENTS 9,746,864 B1 * 8/2017 Narang .................... H04B 1/04
10,234,883 B1 * 3/2019 Du .......................... G05F 1/563
2003/0001550 A1 * 1/2003 Pulkin ..................... G05F 1/575 323/273
2006/0022652 A1 * 2/2006 Nishimura ............. G05F 1/575 323/280
2008/0258696 A1 * 10/2008 Kimura ..................... G05F 1/56 323/269

(Continued)

OTHER PUBLICATIONS

Chen et al., "A Fast-Transient LDO Based on Buffered Flipped Voltage Follower", 2010, EDSSC,The Chinese University of Hong Kong, DOI: 10.1109/EDSSC.2010.5713775 , 4 pages.

(Continued)

*Primary Examiner* — Lakaisha Jackson

(74) *Attorney, Agent, or Firm* — SCULLY, SCOTT, MURPHY & PRESSER, P.C.

(57) ABSTRACT

A capless regulator circuit is provided. The regulator circuit includes a power transistor that controls the supply of current to an external output terminal connected to a load; a monitor transistor provided between the external output terminal and a reference voltage terminal to which a reference voltage is supplied, and through which a current corresponding to the voltage of the external output terminal flows; a first constant current source that is provided in series with the monitor transistor and generates a first voltage according to the difference between the first current and a first constant current; and a cascode circuit that generates a second voltage that amplifies the first voltage and supplies it to the gate of the power transistor.

12 Claims, 16 Drawing Sheets

(56) References Cited

U.S. PATENT DOCUMENTS

2014/0267854 A1 * 9/2014 Shishido ............... H10F 39/026
348/300

OTHER PUBLICATIONS

Wang et al., "A Fast Transient LDO Based on Dual Loop FVF With High PSRR", 2016, APCCAS, DOI: 10.1109/APCCAS.2016.7803906 , 4 pages.

Liu et al., "A Transient-Enhanced Fully-Integrated LDO Regulator for SoC Application", 2018, ISCAS, DOI: 10.1109/ISCAS.2018.8351236 , 5 pages.

* cited by examiner

REGULATOR CIRCUIT FOR ACCEPTING RANGE OF INPUT VOLTAGES WHILE ACHIEVING LOWER POWER CONSUMPTION

CROSS-REFERENCE TO RELATED APPLICATION

This application claims priority under 35 U.S.C. § 119 to Japanese Patent Application No. 2023-042572, filed on Mar. 17, 2023. The disclosure of Japanese Patent Application No. 2023-042572, including the specification, drawings and abstract is incorporated herein by reference in its entirety.

BACKGROUND

The present invention relates to a regulator circuit, for example, a capless regulator circuit that can achieve low power consumption while accepting a wide range of input voltages.

In recent years, there has been a demand for reduction in the number of components and miniaturization in electronic circuits, as well as a reduction in capacitors for improved reliability. Accordingly, the regulator circuit mounted on electronic circuits are required to be capless (capacitor-less). Furthermore, in the regulator circuit, there is a demand for low power consumption and the ability to accept a wide range of input voltages as a circuit that supplies power voltage to the area where circuits that need to operate even in deep standby are arranged, namely, the AON (Always ON) area.

There are disclosed techniques related to the regulator circuit below.

Non-Patent Document 1

University of Hong Kong, "A Fast-Transient LDO Based on Buffered Flipped Voltage Follower", 2010, EDSSC Non-Patent Document 2

NXP, "A Fast Transient LDO Based On Dual Loop FVF With High PSRR", 2016, APCCAS

Non-Patent Document 3

TI, "A Transient-Enhanced Fully-Integrated LDO Regulator for SoC Application", 2018, ISCAS

SUMMARY

However, there has been a problem that the regulator circuit of the related technology cannot simultaneously achieve capless, acceptance of a wide range of input voltages, and low power consumption. Other objects and novel features will become apparent from the description of this specification and the accompanying drawings.

The regulator circuit according to this disclosure includes a power transistor that controls the supply of current to an external output terminal connected to a load, a monitor transistor provided between the external output terminal and a reference voltage terminal to which a reference voltage is supplied and through which a first current flows according to the voltage of the external output terminal, a first constant current source provided in series with the monitor transistor and generating a first voltage according to the difference between the first current and a first constant current, and a cascode circuit that generates a second voltage by amplifying the first voltage and supplies it to the gate of the power transistor.

The present disclosure can provide a capless regulator circuit that can achieve low power consumption while accepting a wide range of input voltages.

DETAILED DESCRIPTION

Hereinafter, the embodiment will be described with reference to the drawings. Note that the drawings are simplified, and the technical scope of the embodiment should not be narrowly interpreted based on the description of these drawings. Also, the same elements are given the same symbols, and redundant descriptions are omitted.

In the following embodiments, for convenience when necessary, the description is divided into multiple sections or embodiments. However, unless specifically stated, they are not unrelated to each other, and one is related to the other as a part or all of a modified example, application example, detailed explanation, supplementary explanation, etc. Also, in the following embodiments, when referring to the number of elements, etc. (including the number, numerical value, quantity, range, etc.), unless specifically stated and obviously limited to a specific number in principle, it is not limited to that specific number, and may be more or less than the specific number.

Furthermore, in the following embodiments, the constituent elements (including the operation steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above-mentioned numbers and the like, including the number, the numerical value, the amount, the range, and the like.

<Preliminary Study by Inventors>

Before describing the regulator circuit according to the present embodiment, the regulator circuit that the present inventors have preliminarily studied will be described.

Figure 10:
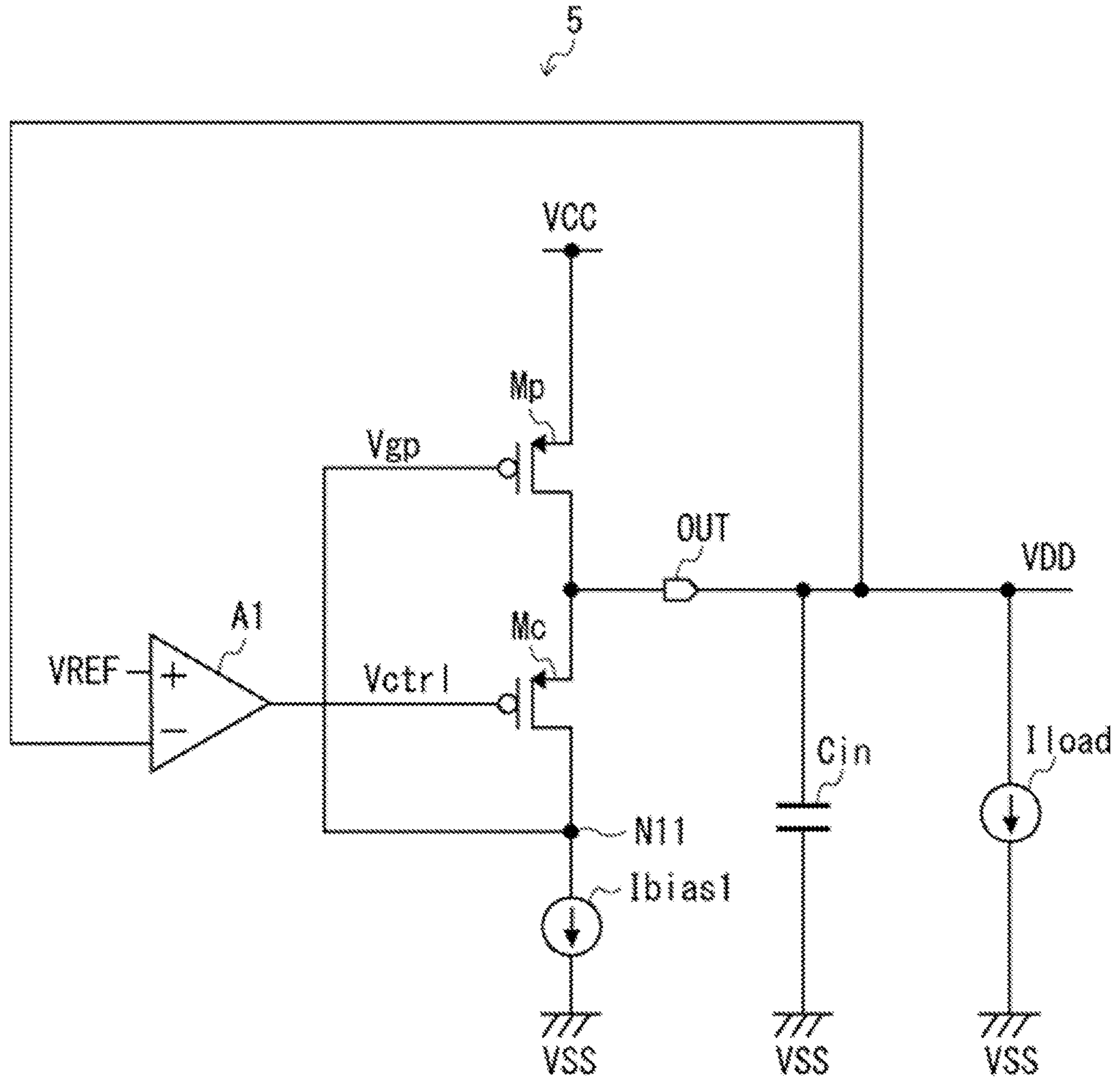
FIG. 10 is a circuit diagram showing a configuration example of a pre-examined regulator circuit.
Figure 11:
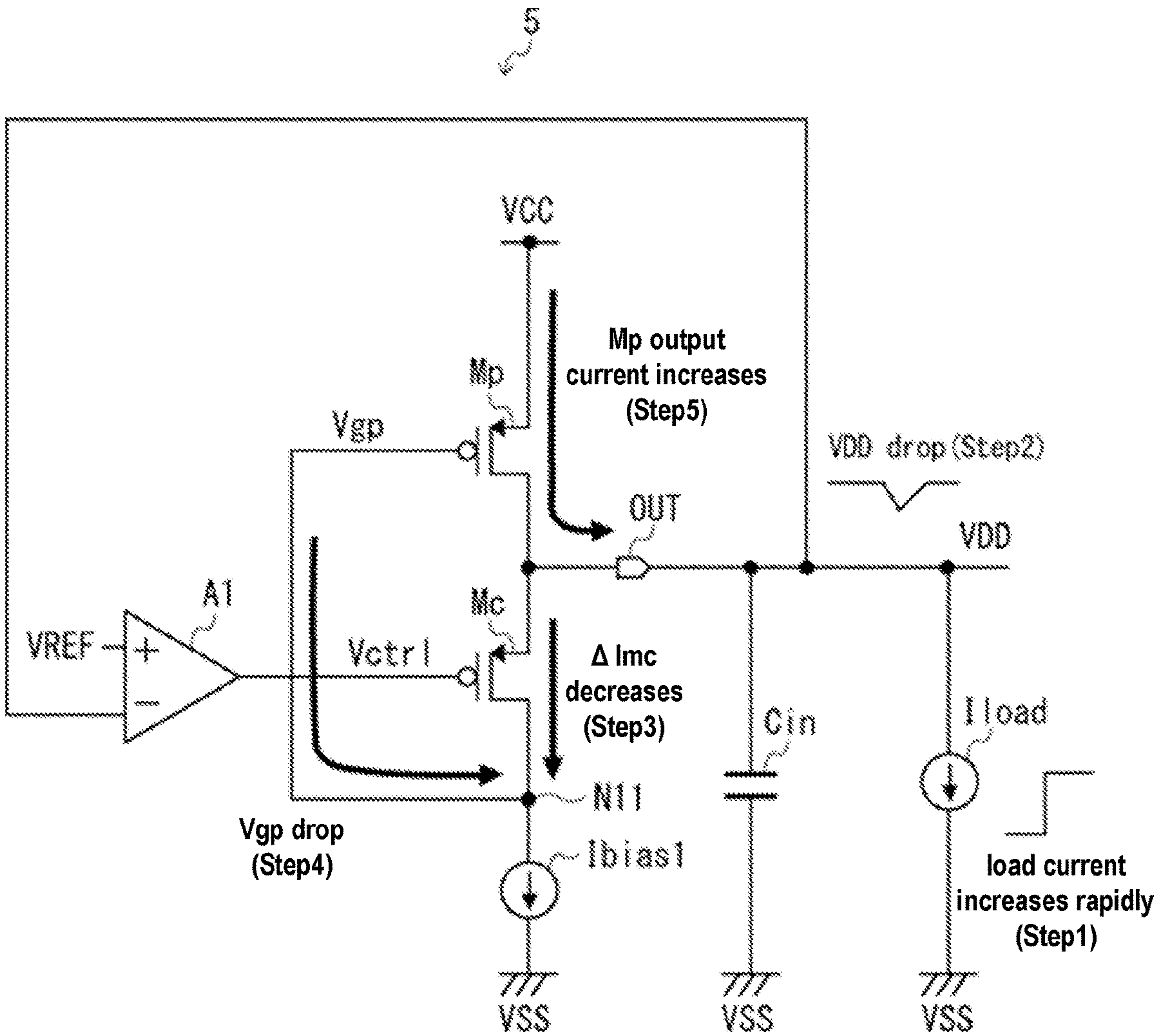
FIG. 11 is a diagram for explaining the effect of the regulator circuit shown in FIG. 10.
Figure 12:
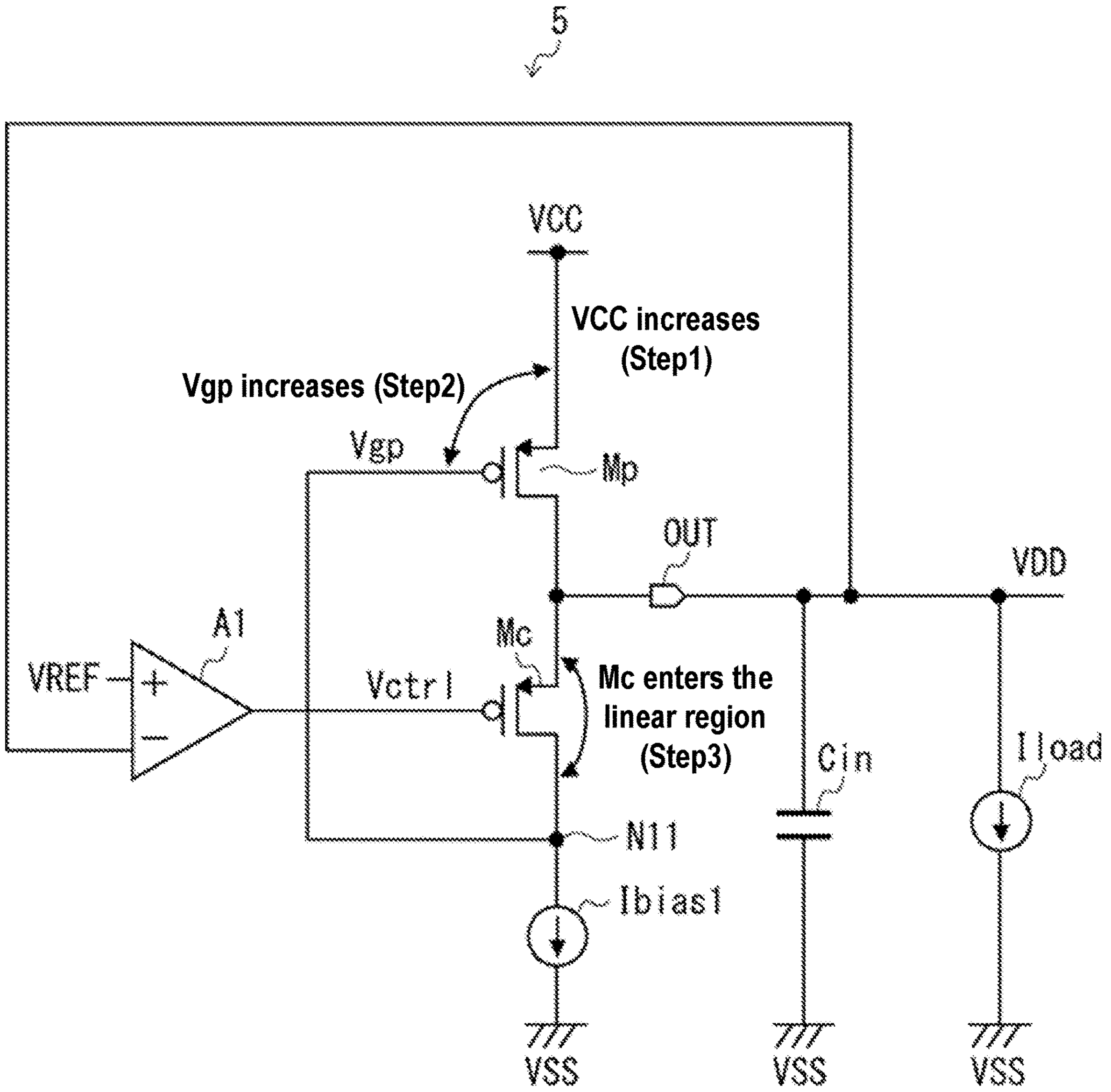
FIG. 12 is a diagram for explaining the problem of the regulator circuit shown in FIG. 10.

FIG. 10 is a circuit diagram showing a configuration example of the regulator circuit 5 that has been preliminarily studied. FIG. 10 also shows the current Iload flowing through the load connected to the output terminal OUT of the regulator circuit 5 and the capacity Cin of the load. FIG. 11 is a diagram for explaining the effect of the regulator circuit 5. FIG. 12 is a diagram for explaining the problem of the regulator circuit 5.

As shown in FIG. 10, the regulator circuit 5 includes a power transistor Mp, a monitor transistor Mc, a constant current source Ibias1, and an amplifier A1.

The power transistor Mp is a P-channel MOS transistor and controls the supply of current from an input terminal (hereinafter referred to as input terminal VCC) supplied with an input voltage VCC from the outside to an output terminal OUT according to the voltage Vgp supplied to the gate. For example, in the power transistor Mp, the source is connected to the input terminal VCC, the drain is connected to the output terminal OUT, and the voltage Vgp is supplied to the gate.

The monitor transistor Mc is a P-channel MOS transistor and flows a current IMc corresponding to the voltage VDD (i.e., the voltage VDD supplied to the load) of the output terminal OUT between the source and the drain. For example, in the monitor transistor Mc, the source is connected to the output terminal OUT, the drain is connected to the input terminal (node N11) of the constant current source Ibias1, and the control voltage Vctrl is supplied to the gate.

The amplifier A1 amplifies the potential difference between the voltage VDD of the output terminal OUT and the reference voltage VREF, and outputs it as the control voltage Vctrl. Therefore, the control voltage Vctrl can be referred to as the feedback voltage of the output voltage VOUT. The output voltage VDD is maintained at the value of the reference voltage VREF by the amplifier A1 and the monitor transistor Mc.

The constant current source Ibias1 is provided between the drain (node N11) of the monitor transistor Mc and a reference voltage terminal (hereinafter referred to as reference voltage terminal VSS) supplied with the reference voltage VSS, and flows a first constant current (hereinafter referred to as constant current Ibias1) between node N11 and the reference voltage terminal VSS. Therefore, at node N11, a voltage Vgp corresponding to the difference between the current IMc flowing between the source and the drain of the monitor transistor Mc and the constant current Ibias1 flowing in the constant current source Ibias1 is generated. This voltage Vgp is supplied to the gate of the power transistor Mp.

Referring to FIG. 11, in the regulator circuit 5, when the load current Iload increases rapidly and the output voltage VDD drops (decreases rapidly), the current IMc flowing between the source and the drain of the monitor transistor Mc decreases. As a result, the amount of charge pulled from the gate of the power transistor Mp increases, causing the gate voltage (node N11 voltage) Vgp of the power transistor Mp to drop. As a result, the current flowing between the source and the drain of the power transistor Mp increases, suppressing the drop in the output voltage VDD.

However, referring to FIG. 12, in the regulator circuit 5, when the input voltage VCC increases, that is, when the source voltage of the power transistor Mp increases, the gate voltage Vgp of the power transistor Mp also increases accordingly. As a result, the drain voltage (node N11 voltage) of the monitor transistor Mc increases, and the source-drain voltage of the monitor transistor Mc decreases, so the monitor transistor Mc may enter the linear region. In that case, the regulator circuit 5 cannot maintain the output voltage VDD at a constant voltage. In other words, the regulator circuit 5 cannot accept a wide range of input voltages VCC.

Therefore, the inventors have considered the regulator circuit 6 next. This will be explained using FIGS. 13 and 14.

Figure 13:
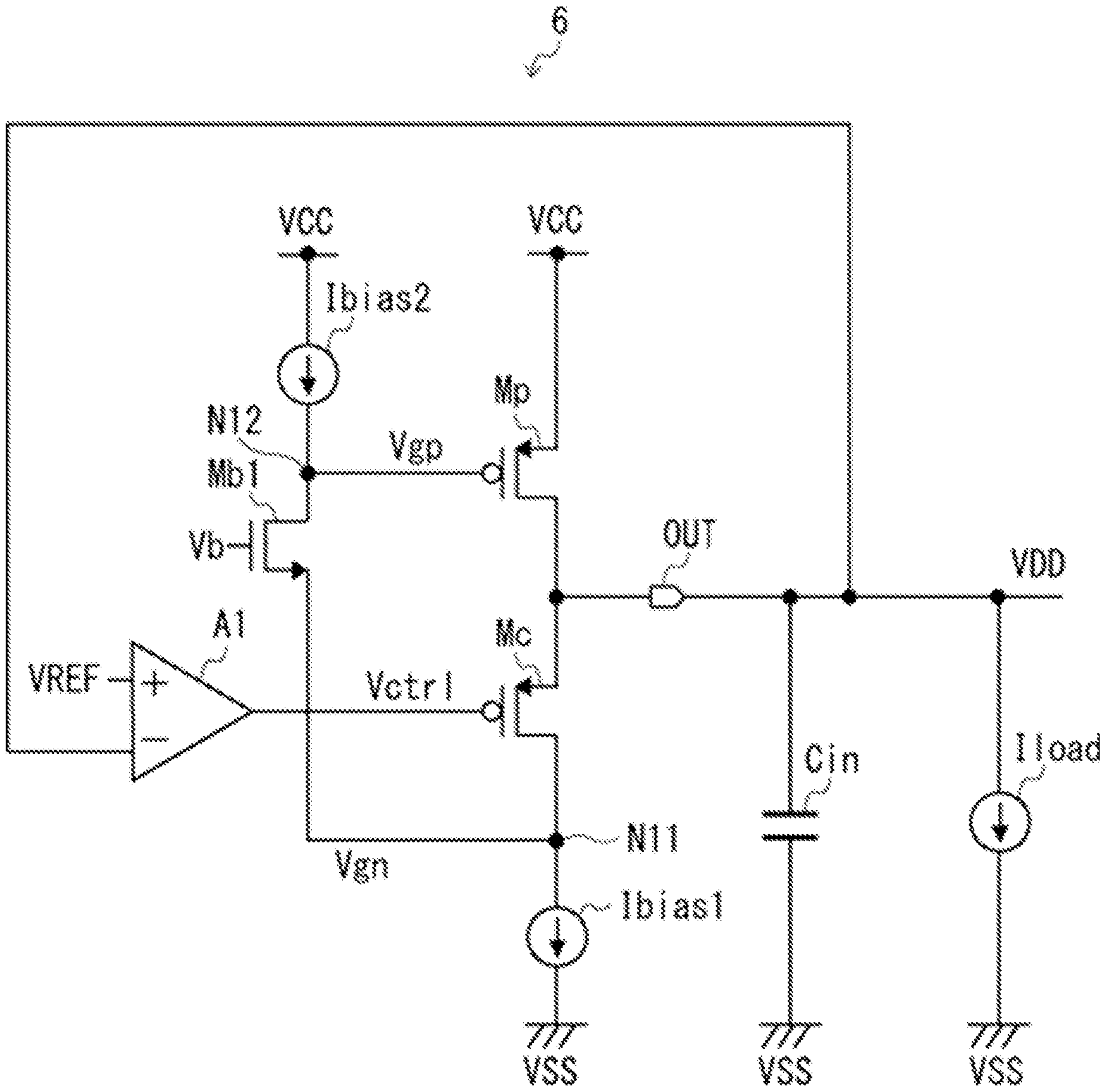
FIG. 13 is a circuit diagram showing a configuration example of a pre-examined regulator circuit.
Figure 14:
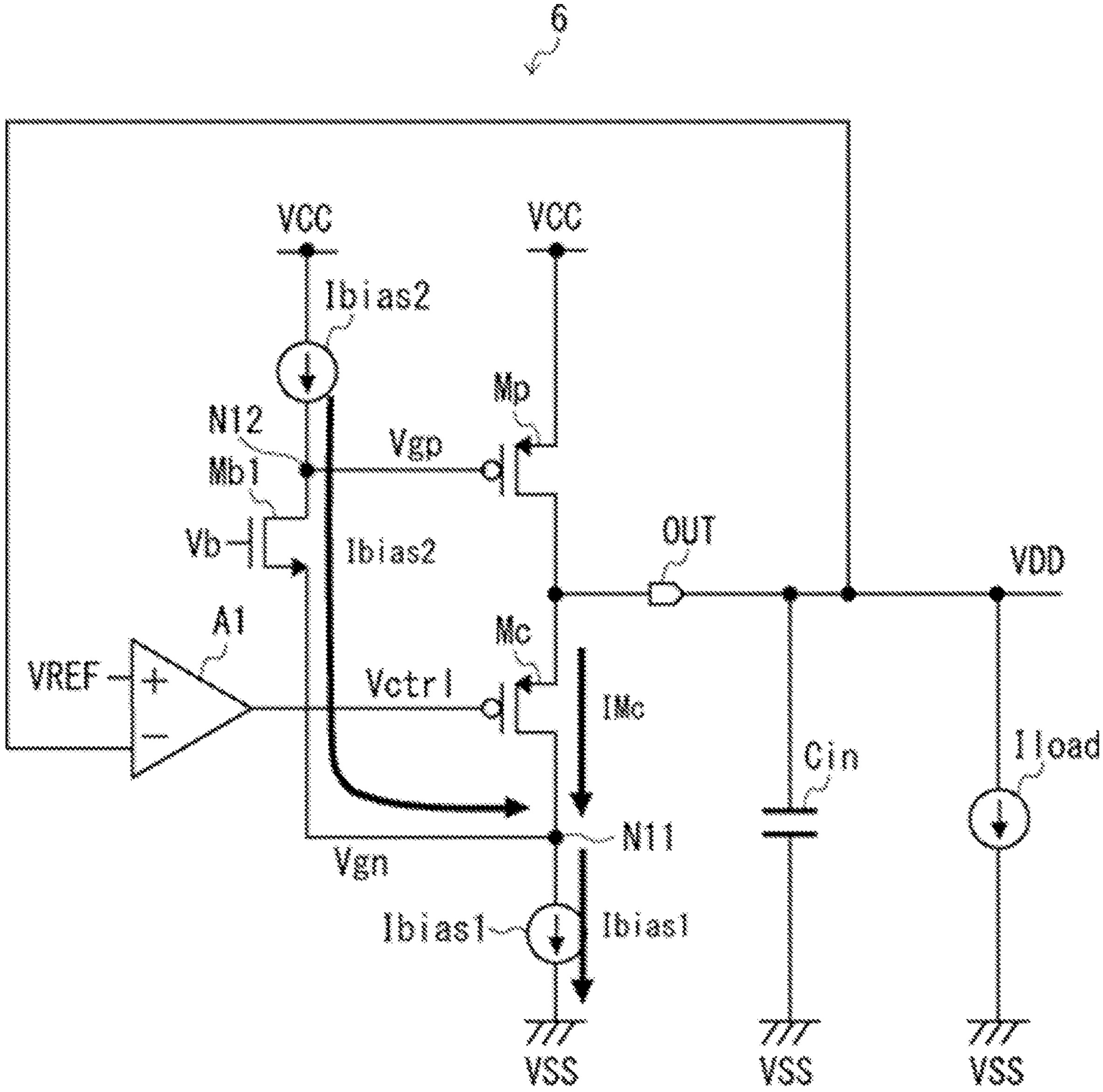
FIG. 14 is a diagram for explaining the problem of the regulator circuit shown in FIG. 13.

FIG. 13 is a circuit diagram showing a configuration example of the regulator circuit 6 that has been pre-examined. FIG. 13 shows the current Iload flowing through the load connected to the output terminal OUT of the regulator circuit 6 and the capacity Cin of the load. FIG. 14 is a diagram for explaining the problems of the regulator circuit 6.

As shown in FIG. 13, the regulator circuit 6 further includes a transistor Mb1 and a constant current source Ibias2, compared to the regulator circuit 5.

The transistor Mb1 is an N-channel MOS transistor. For example, in the transistor Mb1, the source is connected to the drain (node N11) of the monitor transistor Mc, the drain is connected to the output terminal (node N12) of the constant current source Ibias2, and a predetermined voltage Vb is supplied to the gate.

The constant current source Ibias2 is provided between the input terminal VCC and the drain (node N12) of the transistor Mb1 and flows a second constant current (hereinafter referred to as constant current Ibias2) between the input terminal VCC and node N12. Therefore, at node N12, a voltage Vgp is generated according to the constant current Ibias2 flowing through the constant current source Ibias2 and the resistance value of the transistor Mb1.

In other words, the constant current source Ibias2 and the transistor Mb1 amplify the voltage Vgn of node N11 and output it as voltage Vgp. This voltage Vgp is supplied to the gate of the power transistor Mp.

In this way, the regulator circuit 6 prevents the increase in the gate voltage Vgp of the power transistor Mp due to the increase in the input voltage VCC from being transmitted to the drain of the monitor transistor Mc by providing the transistor Mb1 between the gate of the power transistor Mp and the drain of the monitor transistor Mc. As a result, the decrease in the source-drain voltage of the monitor transistor Mc is suppressed, so the monitor transistor Mc can operate in the saturation region. In other words, the regulator circuit 6 can accept a wide range of input voltages VCC.

However, as shown in FIG. 14, in the regulator circuit 6, the constant current source Ibias1 needs to flow a relatively large current Ibias1 that combines the current IMc flowing through the monitor transistor Mc and the constant current Ibias2 flowing through the constant current source Ibias2, resulting in increased power consumption.

The inventors also considered the regulator circuit 7. This will be explained using FIGS. 15 and 16.

Figure 15:
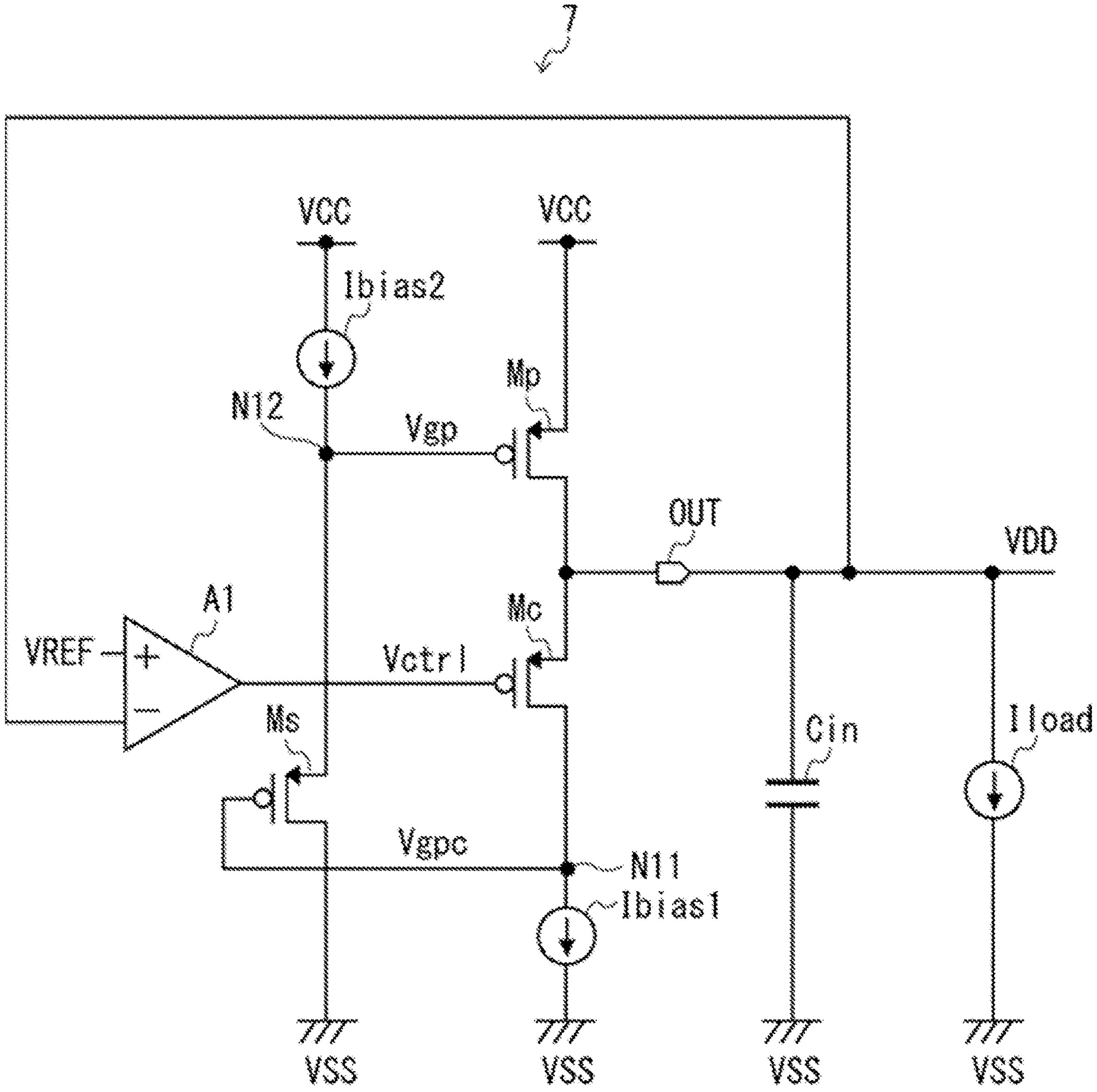
FIG. 15 is a circuit diagram showing a configuration example of a pre-examined regulator circuit.
Figure 16:
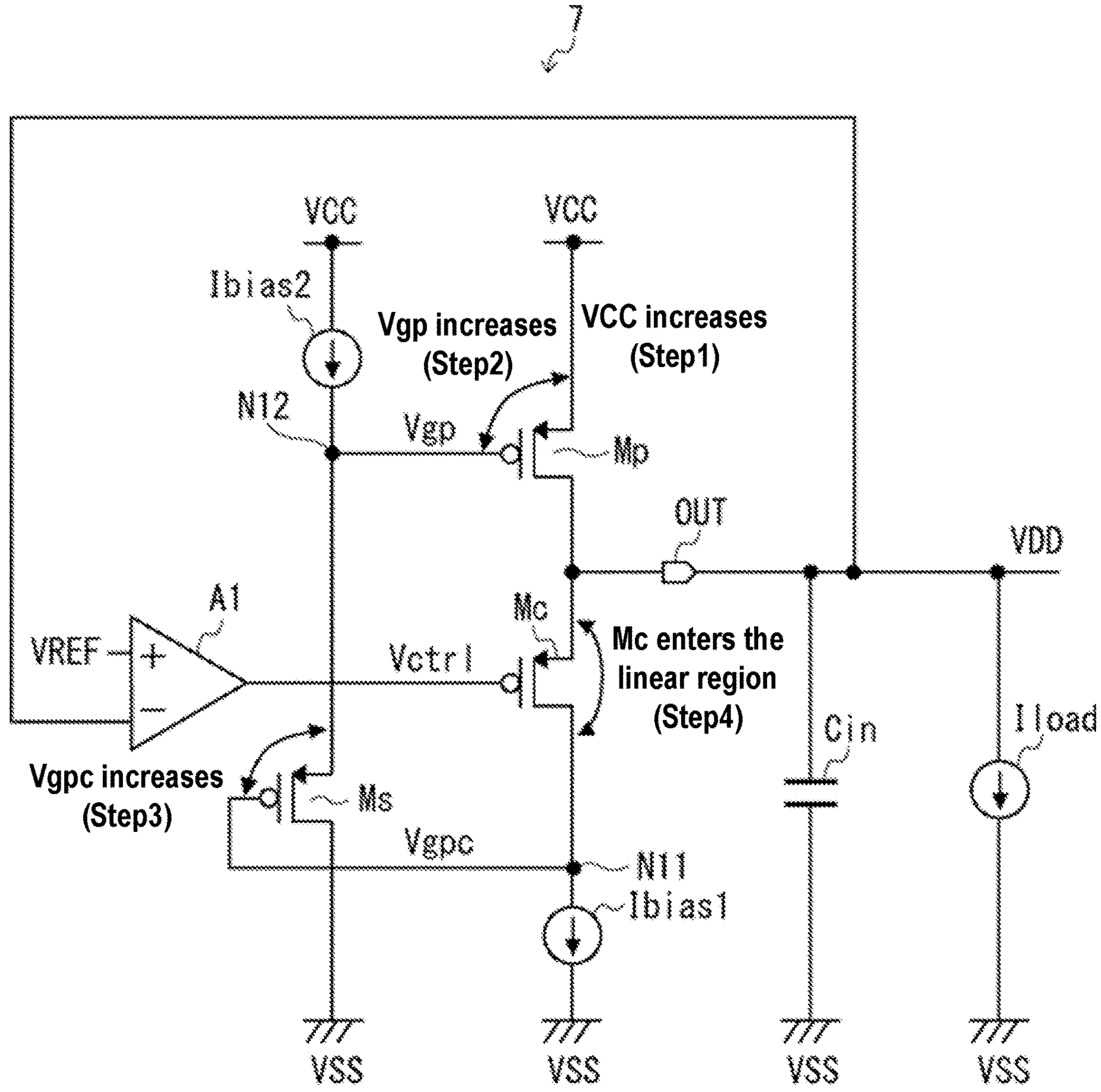
FIG. 16 is a diagram for explaining the problem of the regulator circuit shown in FIG. 15.

FIG. 15 is a circuit diagram showing a configuration example of the regulator circuit 7 that has been pre-examined. FIG. 15 shows the current Iload flowing through the load connected to the output terminal OUT of the regulator circuit 7 and the capacity Cin of the load. FIG. 16 is a diagram for explaining the problems of the regulator circuit 7.

As shown in FIG. 15, the regulator circuit 7 further includes a transistor Ms and a constant current source Ibias2, compared to the regulator circuit 5.

The transistor Ms is a P-channel MOS transistor that outputs a source voltage according to the voltage Vgpc of node N11 supplied to the gate. The transistor Ms is a so-called source follower. For example, in the transistor Ms, the source is connected to the output terminal (node N12) of the constant current source Ibias2, the drain is connected to the reference voltage terminal VSS, and the voltage Vgpc of node N11 is supplied to the gate.

The constant current source Ibias2 is provided between the input terminal VCC and the source (node N12) of the transistor Ms and flows a second constant current (hereinafter referred to as constant current Ibias2) between the input terminal VCC and node N12. Therefore, a voltage Vgp is generated at node N12 according to the constant current Ibias2 flowing through the constant current source Ibias2 and the resistance value of the transistor Ms.

In other words, the constant current source Ibias2 and the transistor Ms amplify the voltage Vgpc of node N11 and output it as voltage Vgp. This voltage Vgp is supplied to the gate of the power transistor Mp.

Thus, by providing the transistor Ms, which forms a source follower between the gate of the power transistor Mp and the drain of the monitor transistor Mc, the regulator circuit 7 can easily secure the bias point of the monitor transistor Mc and suppress the increase of the current Ibias1 flowing through the constant current source Ibias1.

However, referring to FIG. 16, in the regulator circuit 7, when the input voltage VCC rises, that is, when the source voltage of the power transistor Mp rises, the gate voltage Vgp of the power transistor Mp rises accordingly, and the gate voltage Vgpc of the transistor Ms also rises. As a result, the drain voltage (voltage of node N11) of the monitor transistor Mc rises, and the source-drain voltage of the monitor transistor Mc decreases, so there is a possibility that the monitor transistor Mc enters the linear region. In that case, the regulator circuit 7 cannot maintain the output voltage VDD at a constant voltage. In other words, the regulator circuit 7 cannot accept a wide range of input voltages VCC, just like the regulator circuit 5.

Therefore, a capless (capacitor-less) regulator circuit 1 that can accept a wide range of input voltages while achieving low power consumption has been found.

First Embodiment

Figure 1:
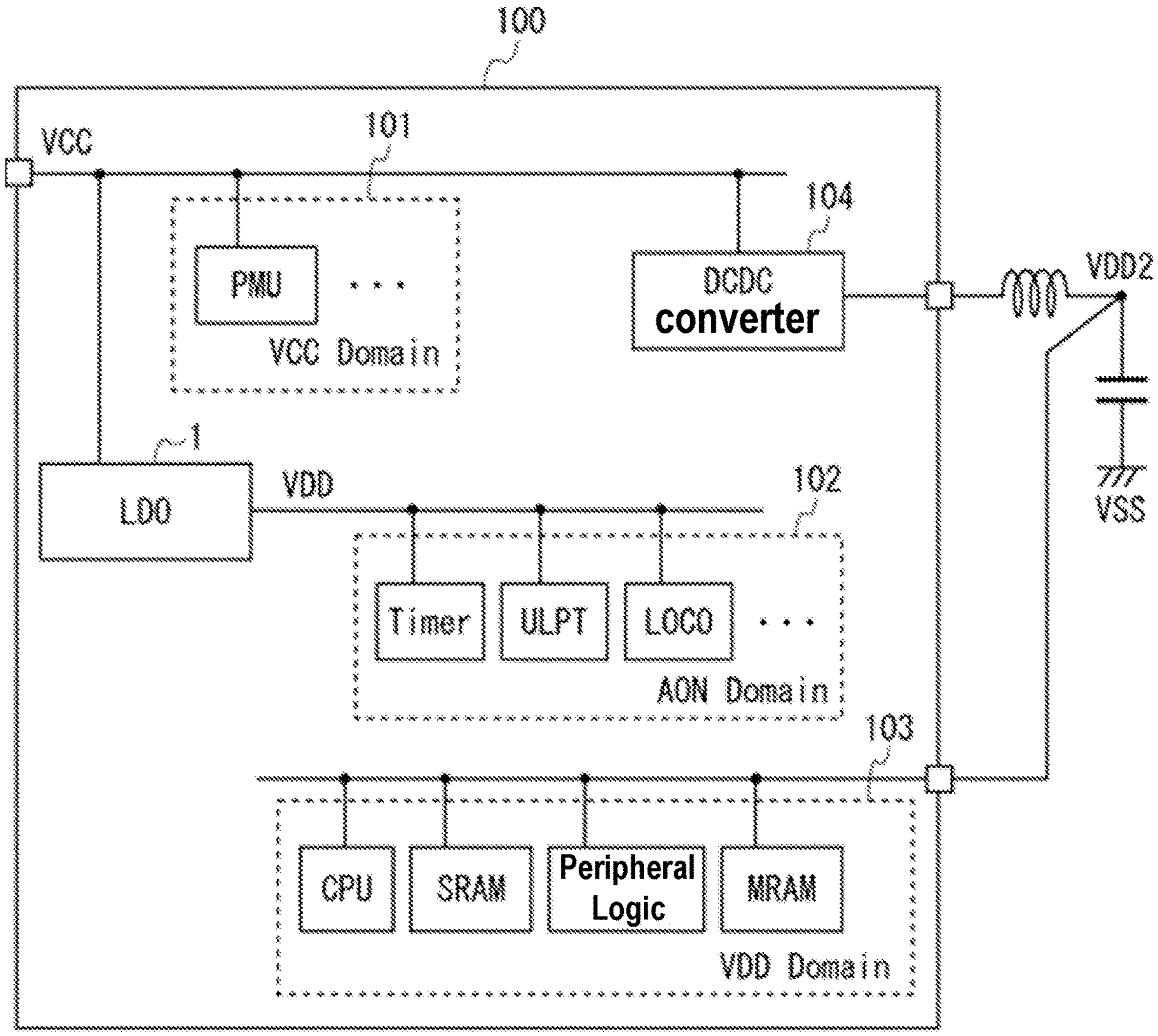
FIG. 1 is a block diagram showing a configuration example of a semiconductor device equipped with a regulator circuit according to a first embodiment.

FIG. 1 is a diagram showing an example of a configuration of a semiconductor device 100 equipped with a regulator circuit 1 according to the first embodiment. As shown in FIG. 1, the semiconductor device 100 includes three circuit arrangement areas 101 to 103, a regulator circuit (LDO; Low Drop Out) 1, and a DCDC converter 104. The circuit arrangement area 101 is an area where a circuit that operates with an input voltage VCC supplied from outside the semiconductor device 100 is arranged. The circuit arrangement area 102 is an area where a circuit that operates with a voltage VDD output from the regulator circuit 1 is arranged. In addition, the circuit arrangement area 103 is an area where a circuit that operates with a voltage VDD2 output from the DCDC converter 104 is arranged. In particular, a circuit that needs to operate even during deep standby is arranged in the circuit arrangement area 102. The circuit (logic circuit) arranged in the circuit arrangement area 102 is composed of transistors with a thinner gate oxide film than the transistors used in the circuit arranged in the circuit arrangement area 101.

In recent years, the semiconductor device 100 is required to reduce the number of components and miniaturize, and to reduce capacitors for improving reliability. Accordingly, the regulator circuit 1 mounted on the semiconductor device 100 is required to be capless (capacitor-less). Furthermore, the regulator circuit 1 is required to be capable of accepting a wide range of input voltages as a circuit for supplying the power supply voltage VDD to the circuit arrangement area 102, with low power consumption.

Figure 2:
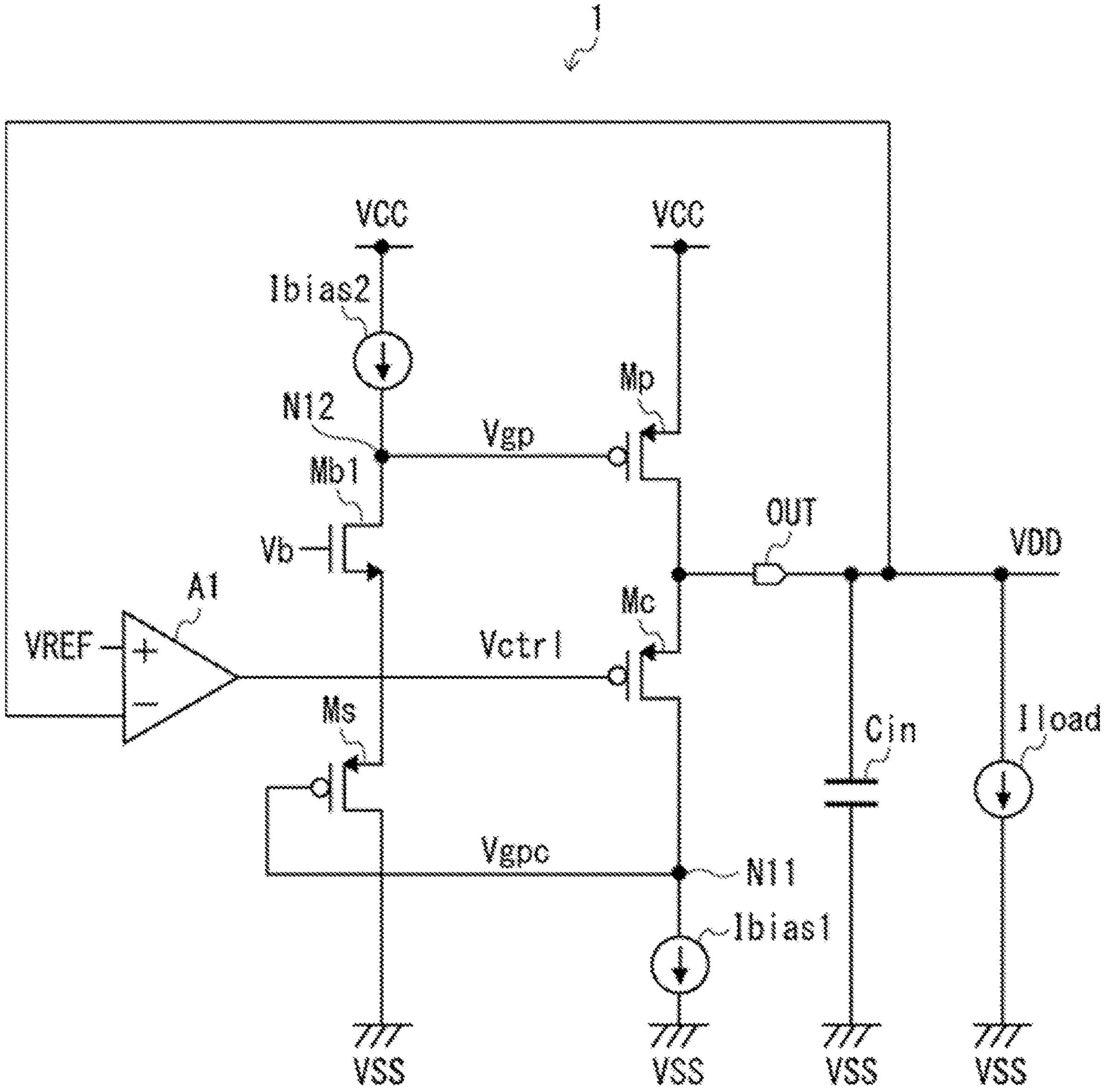
FIG. 2 is a circuit diagram showing a configuration example of the regulator circuit according to the first embodiment.

FIG. 2 is a circuit diagram showing an example of the configuration of the regulator circuit 1. FIG. 2 also shows the current Iload flowing through the load connected to the output terminal OUT of the regulator circuit 1 and the capacity Cin of the load.

As shown in FIG. 2, the regulator circuit 1 includes a power transistor Mp, a monitor transistor Mc, a transistor Ms, a transistor Mb1, a constant current source Ibias1, a constant current source Ibias2, and an amplifier A1. A cascode circuit is formed by the transistor Ms, Mb1 and the constant current source Ibias2.

The power transistor Mp is a P-channel MOS transistor and controls the supply of current from an input terminal (hereinafter referred to as input terminal VCC) supplied with an input voltage VCC from the outside to an output terminal OUT according to a voltage (second voltage) Vgp supplied to the gate. For example, in the power transistor Mp, the source is connected to the input terminal VCC, the drain is connected to the output terminal OUT, and the voltage Vgp is supplied to the gate.

The monitor transistor Mc is a P-channel MOS transistor and flows a current IMc corresponding to the voltage VDD (i.e., the voltage VDD supplied to the load) of the output terminal OUT between the source and drain. For example, in the monitor transistor Mc, the source is connected to the output terminal OUT, the drain is connected to the input terminal (node N11) of the constant current source Ibias1, and the control voltage Vctrl is supplied to the gate.

The amplifier A1 amplifies the potential difference between the voltage VDD of the output terminal OUT and the reference voltage VREF, and outputs it as the control voltage Vctrl. Therefore, the control voltage Vctrl can be referred to as the feedback voltage of the output voltage VOUT. The output voltage VDD is maintained at the value of the reference voltage VREF by the amplifier A1 and the monitor transistor Mc.

The constant current source Ibias1 is provided between the drain (node N11) of the monitor transistor Mc and a reference voltage terminal (hereinafter referred to as reference voltage terminal VSS) supplied with the reference voltage VSS, and flows a first constant current (hereinafter referred to as constant current Ibias1) between node N11 and the reference voltage terminal VSS. Therefore, a voltage (first voltage) Vgpc corresponding to the difference between the current IMc flowing between the source and drain of the monitor transistor Mc and the constant current Ibias1 flowing in the constant current source Ibias1 is generated at node N11.

The transistor Ms is a P-channel MOS transistor, and outputs a source voltage corresponding to the voltage Vgpc supplied to the gate. The transistor Ms is a so-called source follower. For example, in the transistor Ms, the source is connected to the source of the transistor Mb1, the drain is connected to the reference voltage terminal VSS, and the voltage Vgpc is supplied to the gate.

The transistor Mb1 is an N-channel MOS transistor and is connected in series with the transistor Ms. For example, in the transistor Mb1, the source is connected to the source of the transistor Ms, the drain is connected to the output terminal (node N12) of the constant current source Ibias2, and a predetermined voltage Vb is supplied to the gate.

The constant current source Ibias2 is provided between the input terminal VCC and the drain (node N12) of the transistor Mb1 and flows a second constant current (hereinafter referred to as constant current Ibias2) between the input terminal VCC and node N12. Therefore, a voltage (second voltage) Vgp corresponding to the constant current Ibias2 flowing in the constant current source Ibias2 and the respective resistance values of the transistors Ms and Mb1 is generated at node N12.

In the regulator circuit 1, when the load current Iload increases rapidly and the output voltage VDD drops (decreases rapidly), the current IMc flowing between the source and drain of the monitor transistor Mc decreases. As a result, the amount of charge pulled from the gate of the transistor Ms increases, causing the gate voltage (voltage of node N11) Vgpc of the transistor Ms to drop. This in turn increases the current flowing between the source and drain of the transistor Ms, causing the gate voltage (voltage of node N12) Vgp of the power transistor Mp to drop. As a result, the current flowing between the source and drain of the power transistor Mp increases, suppressing the drop in the output voltage VDD.

Here, the regulator circuit 1 prevents the increase in the gate voltage Vgp of the power transistor Mp due to the rise in the input voltage VCC from being transmitted to the drain of the monitor transistor Mc by providing a transistor Mb1 between the gate of the power transistor Mp and the drain of the monitor transistor Mc. This suppresses the drop in the voltage between the source and drain of the monitor transistor Mc, allowing the monitor transistor Mc to operate in the saturation region. In other words, the regulator circuit 1 can accept a wide range of input voltages VCC.

Furthermore, the regulator circuit 1 facilitates the bias point assurance of the monitor transistor Mc and prevents the current of the constant current source Ibias2 from flowing into the constant current source Ibias1 by providing a transistor Ms, which forms a source follower, between the gate of the power transistor Mp and the drain of the monitor transistor Mc. In other words, it can suppress the increase in the current Ibias1 flowing into the constant current source Ibias1.

The transistor Ms preferably has a gate oxide film thinner than the gate oxide film of the power transistor Mp. For example, the transistor Ms preferably has the same gate oxide film as the transistor used in the circuit (logic circuit) arranged in the circuit arrangement area 102 shown in FIG. 1. Generally, when two stages of transistors Ms, Mb1 are provided, it becomes difficult to maintain a constant output voltage VDD when the input voltage VCC is low. However, by utilizing the characteristic of the source of the N-channel MOS transistor Mb1 that prevents the application of high voltage, and by using the transistor Ms with a thin gate oxide film, the output voltage VDD can be maintained constant even when the input voltage VCC is low.

The monitor transistor Mc may also have a gate oxide film thinner than the gate oxide film of the power transistor Mp, similar to the transistor Ms. This allows the transistors Ms, Mb1 to be formed using the same mask as the transistor used in the circuit (logic circuit) arranged in the circuit arrangement area 102 shown in FIG. 1, preventing an increase in the number of masks.

Thus, the capless regulator circuit 1 according to the present embodiment can accept a wide range of input voltages while achieving low power consumption.

First Modified Example of Regulator Circuit 1

Figure 3:
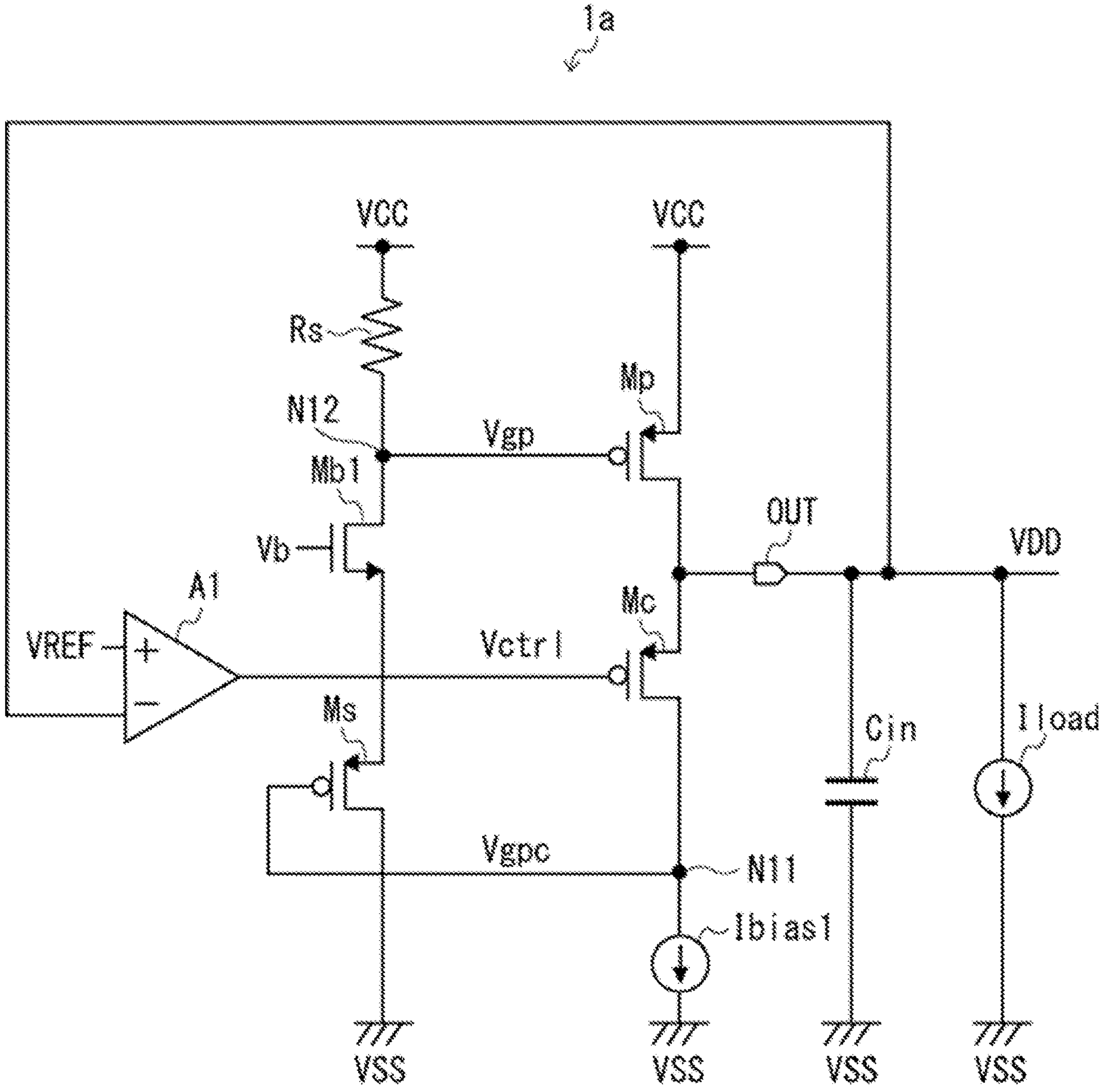
FIG. 3 is a circuit diagram showing a first modified example of the regulator circuit according to the first embodiment.

FIG. 3 is a circuit diagram showing the first modified example of regulator circuit 1 as regulator circuit 1*a*. As shown in FIG. 3, regulator circuit 1*a* includes a resistor element Rs as a constant current source Ibias2, compared to regulator circuit 1. The other components of regulator circuit 1*a* are the same as those of regulator circuit 1, so their description is omitted.

Regulator circuit 1*a* can achieve effects equivalent to those of regulator circuit 1. Furthermore, by using the resistor element Rs, regulator circuit 1*a* can reduce the impedance of the gate (node N12) of the power transistor Mp and shift the pole to the high frequency side. As a result, regulator circuit 1*a* can further improve the stability of the output voltage VDD.

Second Modified Example of Regulator Circuit 1

Figure 4:
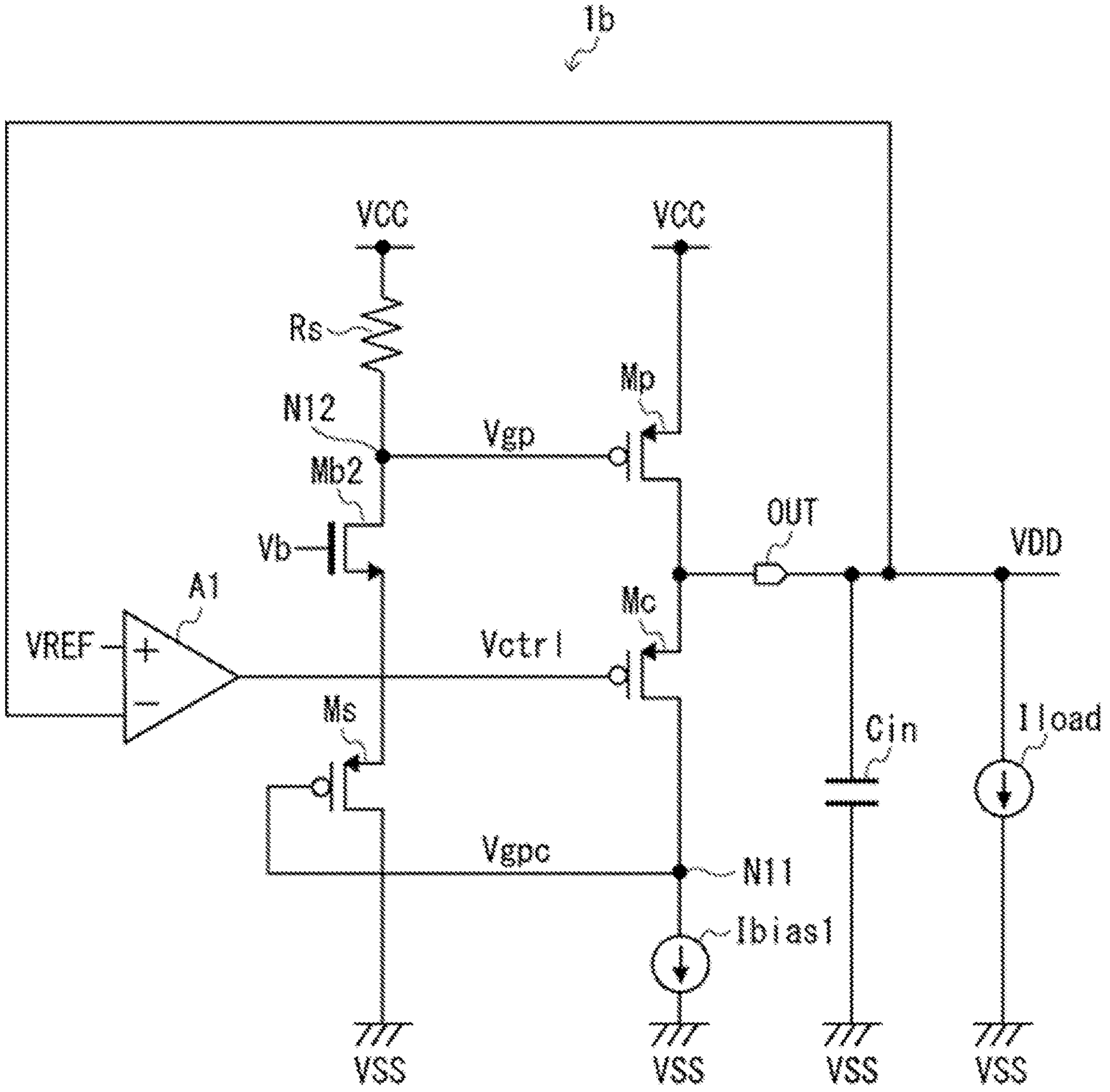
FIG. 4 is a circuit diagram showing a second modified example of the regulator circuit according to the first embodiment.

FIG. 4 is a circuit diagram showing the second modified example of regulator circuit 1 as regulator circuit 1*b*. As shown in FIG. 4, regulator circuit 1*b* includes a transistor Mb2, which is a depletion-type N-channel MOS transistor, instead of transistor Mb1, compared to regulator circuit 1*a*. The other components of regulator circuit 1*b* are the same as those of regulator circuit 1*a*, so their description is omitted.

Regulator circuit 1*b* can achieve effects equivalent to those of regulator circuit 1*a*. Furthermore, by using the transistor Mb2, which is a depletion-type N-channel MOS transistor, regulator circuit 1*b* can lower the threshold voltage than transistor Mb1, thereby lowering the lower limit of the acceptable input voltage VCC.

In this example, the case where the transistor Mb1 of regulator circuit 1*a* is replaced with transistor Mb2 is described, but this is not limited to this. Of course, the transistor Mb1 of regulator circuit 1 may be replaced with transistor Mb2.

Third Modified Example of Regulator Circuit 1

Figure 5:
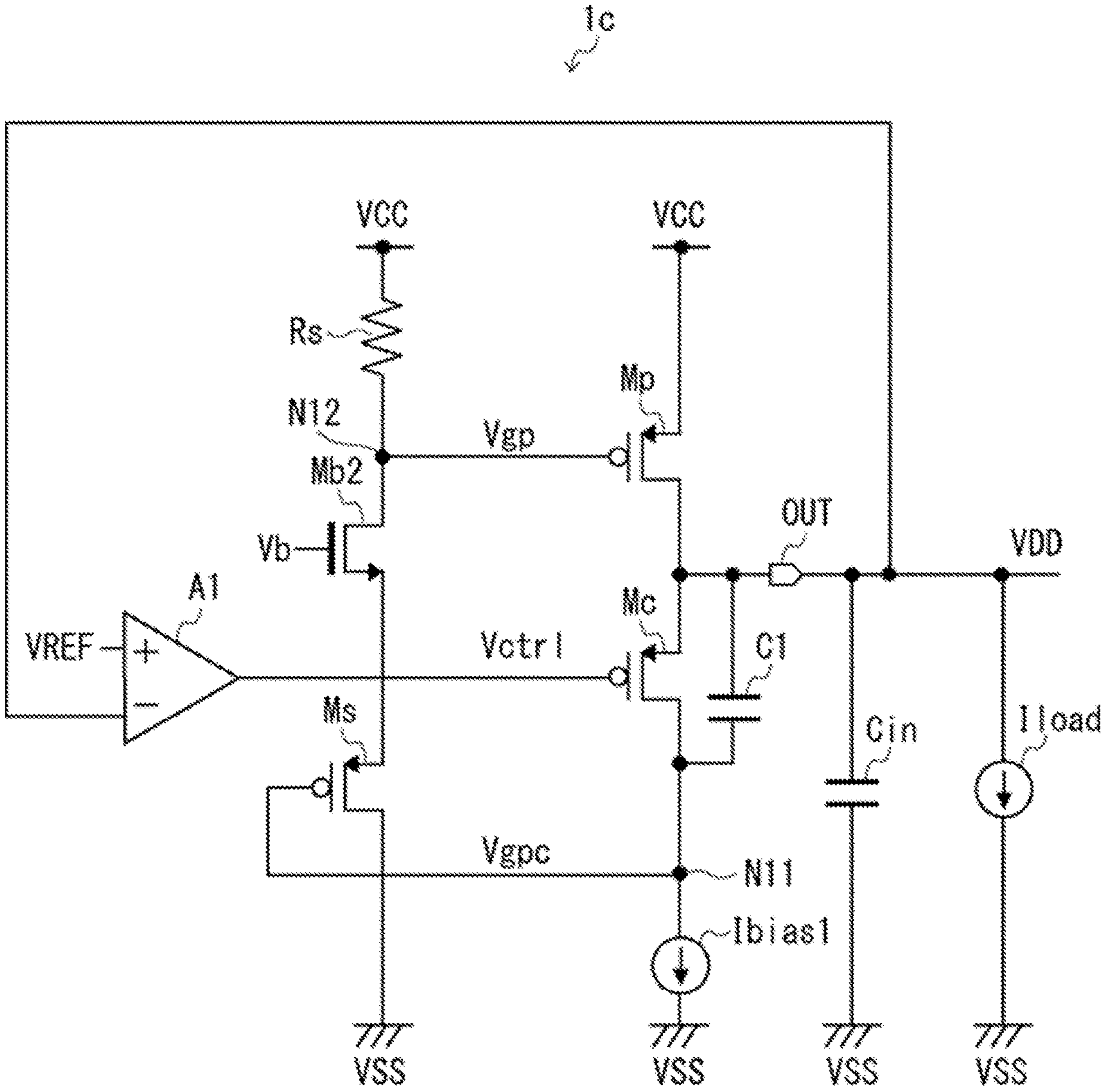
FIG. 5 is a circuit diagram showing a third modified example of the regulator circuit according to the first embodiment.

FIG. 5 is a circuit diagram showing the third modified example of regulator circuit 1 as regulator circuit 1*c*. As shown in FIG. 5, regulator circuit 1*c* includes a capacitive element C1 in addition to regulator circuit 1*b*. The capacitive element C1 is provided between the source and drain of the monitor transistor Mc. The other components of regulator circuit 1*c* are the same as those of regulator circuit 1*b*, so their description is omitted.

Regulator circuit 1*c* can achieve effects equivalent to those of regulator circuit 1*b*. Furthermore, by providing the capacitive element C1 between the nodes that are in phase in the feedback path from the output terminal OUT to the gate of the power transistor Mp via transistors Mc, Ms, and Mb2, regulator circuit 1*c* can form a zero point and further improve the stability of the output voltage VDD.

In this example, the case where the capacitive element C1 is added to regulator circuit 1*b* is described, but this is not limited to this. Of course, the capacitive element C1 may be added to any of regulator circuits 1 to 1*a*.

Fourth Modified Example of Regulator Circuit 1

Figure 6:
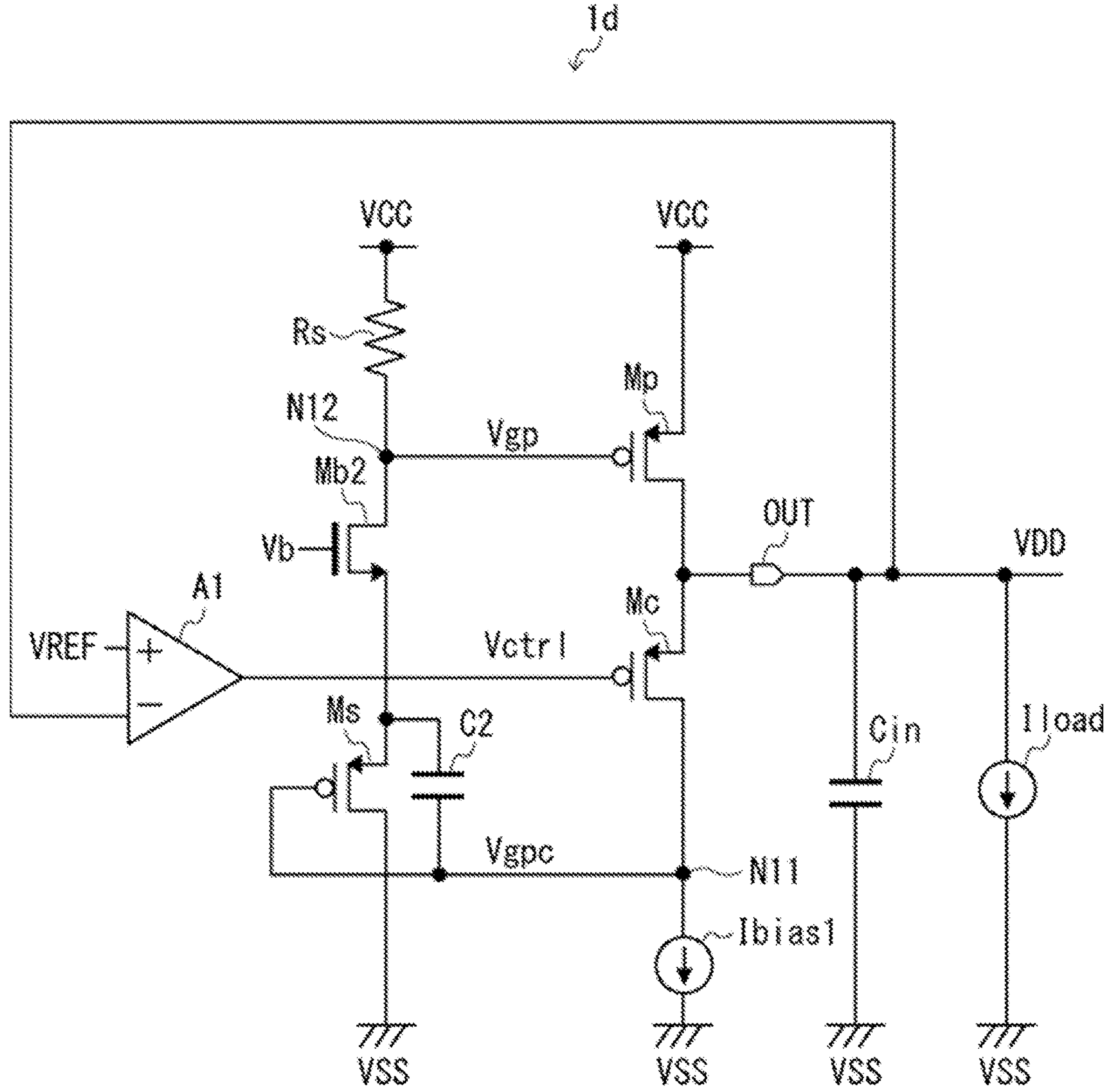
FIG. 6 is a circuit diagram showing a fourth modified example of the regulator circuit according to the first embodiment.

FIG. 6 is a circuit diagram showing the fourth modified example of regulator circuit 1 as regulator circuit 1*d*. As shown in FIG. 6, regulator circuit 1*d* further includes a capacitive element C2 compared to regulator circuit 1*b*. The capacitive element C2 is provided between the gate and source of the transistor Ms. The other components of regulator circuit 1*d* are the same as those of regulator circuit 1*b*, so their description is omitted.

Regulator circuit 1*d* can achieve an effect equivalent to that of regulator circuit 1*b*. Furthermore, by providing the capacitive element C2 between the nodes that are in phase in the feedback path from the output terminal OUT to the gate of the power transistor Mp via transistors Mc, Ms, Mb2, regulator circuit 1*d* can form a zero point and further improve the stability of the output voltage VDD.

In this example, although the case where the capacitive element C2 is added to the regulator circuit 1*b* is described, it is not limited to this. Of course, the capacitive element C2 may be added to any of regulator circuits 1 to 1*a*.

Fifth Modified Example of Regulator Circuit 1

Figure 7:
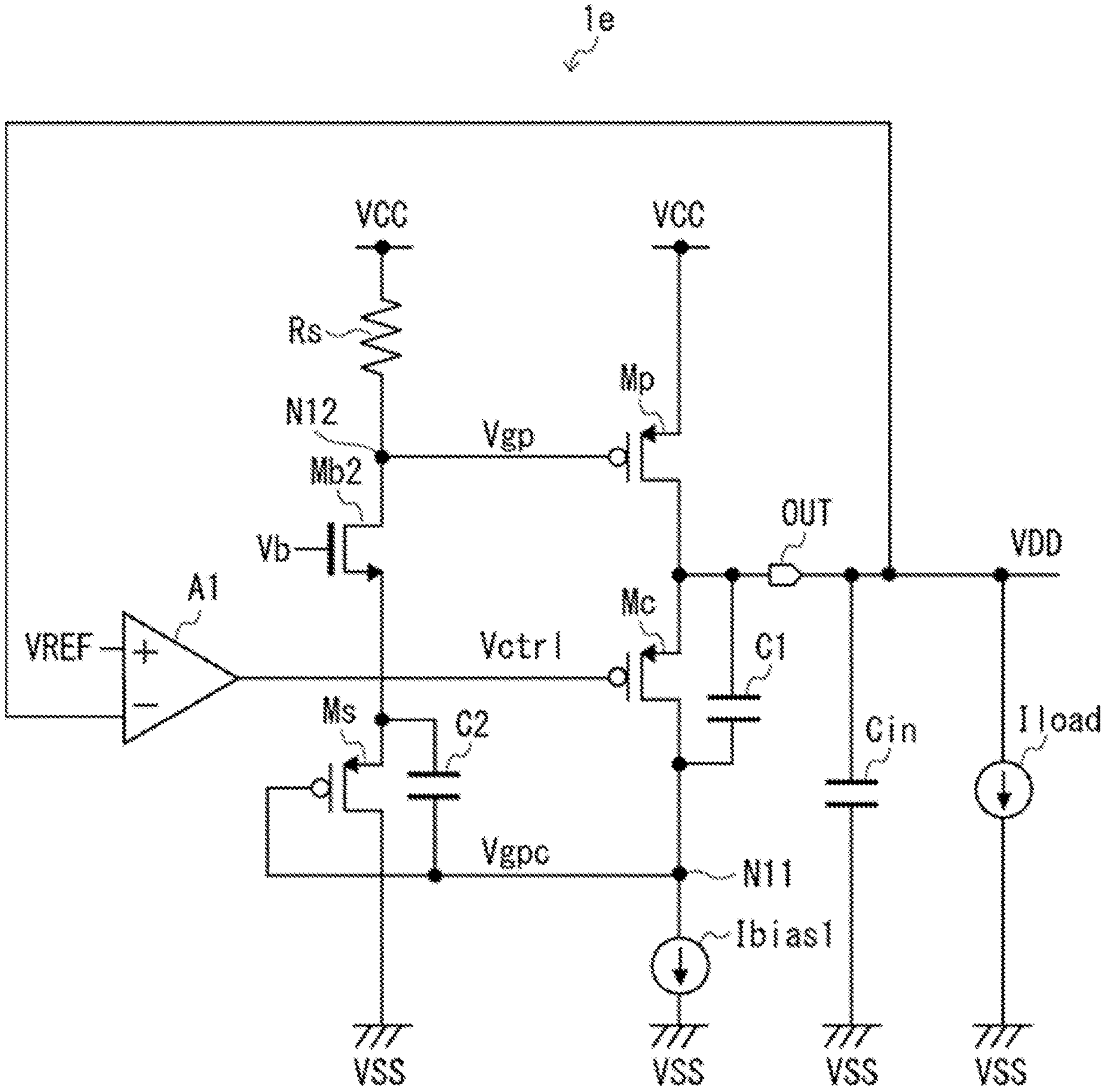
FIG. 7 is a circuit diagram showing a fifth modified example of the regulator circuit according to the first embodiment.

FIG. 7 is a circuit diagram showing the fifth modified example of regulator circuit 1 as regulator circuit 1*e*. As shown in FIG. 7, regulator circuit 1*e* further includes capacitive elements C1 and C2 compared to regulator circuit 1*b*. The capacitive element C1 is provided between the source and drain of the monitor transistor Mc. The capacitive element C2 is provided between the gate and source of the transistor Ms. The other components of regulator circuit 1*e* are the same as those of regulator circuit 1*b*, so their description is omitted.

Regulator circuit 1*e* can achieve an effect equivalent to that of regulator circuit 1*b*. Furthermore, by providing the capacitive elements C1 and C2 between the nodes that are in phase in the feedback path from the output terminal OUT to the gate of the power transistor Mp via transistors Mc, Ms, Mb2, regulator circuit 1*d* can form a zero point and further improve the stability of the output voltage VDD.

In this example, although the case where the capacitive elements C1 and C2 are added to the regulator circuit 1*b* is described, it is not limited to this. Of course, the capacitive elements C1 and C2 may be added to any of regulator circuits 1 to 1*a*.

Sixth Modified Example of Regulator Circuit 1

Figure 8:
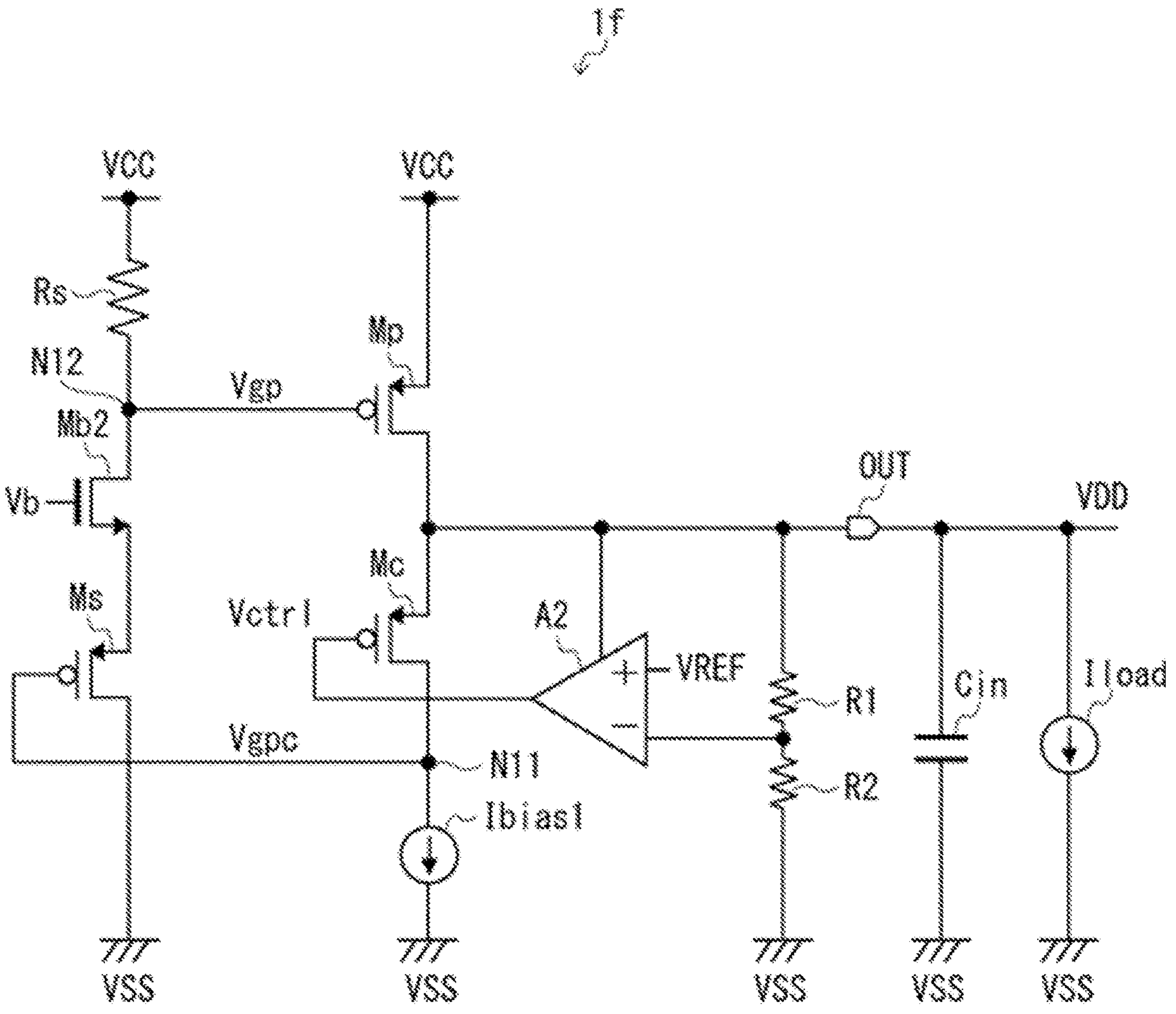
FIG. 8 is a circuit diagram showing a sixth modified example of the regulator circuit according to the first embodiment.

FIG. 8 is a circuit diagram showing the sixth modified example of regulator circuit 1 as regulator circuit 1*f*. As shown in FIG. 8, regulator circuit 1*f* includes amplifier A2 instead of amplifier A1 compared to regulator circuit 1*b*.

Amplifier A2 amplifies the potential difference between the voltage divided by the output voltage VDD using resistive elements R1 and R2 and the reference voltage VREF, and outputs it as control voltage Vctrl. Here, amplifier A2 is driven by the output voltage VDD and is composed of multiple transistors with a gate oxide film thickness thinner than that of the power transistor (i.e., transistors used in logic circuits). The other components of regulator circuit 1*f* are the same as those of regulator circuit 1*b*, so their description is omitted.

Regulator circuit 1*f* can achieve an effect equivalent to that of regulator circuit 1*b*. Furthermore, by using amplifier A2 driven by the output voltage VDD, regulator circuit 1*f* can reduce the impedance of the regulator output, thereby further improving the stability of the output voltage VDD.

In this example, although the description has been made on the case where the amplifier A1 of the regulator circuit 1*b* is replaced with the amplifier A2, it is not limited thereto. Naturally, the amplifier A1 of any of the regulator circuits 1, 1*a*, 1*c*, 1*d*, 1*e* may be replaced with the amplifier A2.

Seventh Modified Example of Regulator Circuit 1

Figure 9:
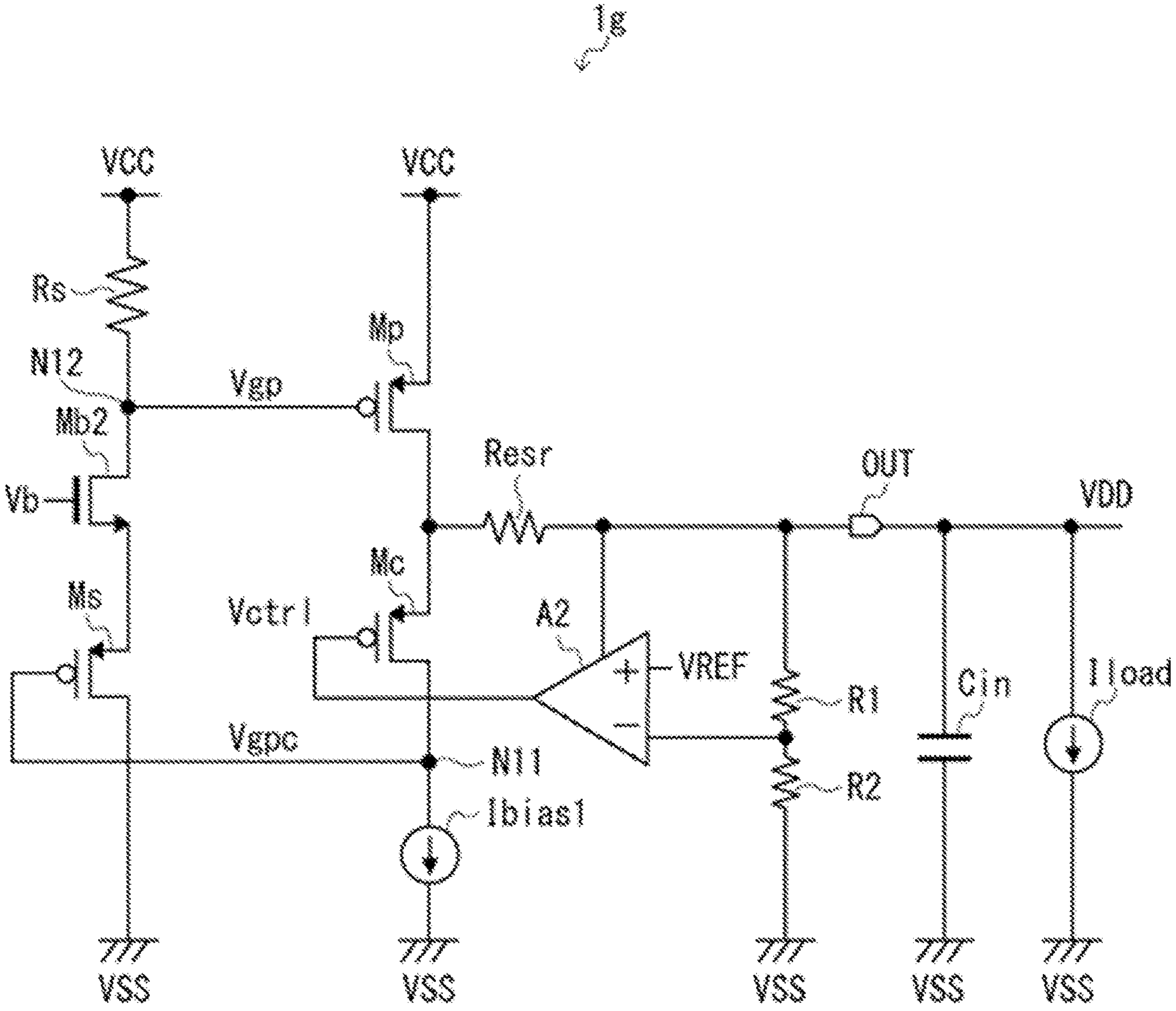
FIG. 9 is a circuit diagram showing a seventh modified example of the regulator circuit according to the first embodiment.

FIG. 9 is a circuit diagram showing the 7th modified example of the regulator circuit 1 as the regulator circuit 1*g*. As shown in FIG. 9, the regulator circuit 1*g* further includes a resistive element Resr compared to the regulator circuit 1*f*. The resistive element Resr is provided between the node of the transistors Mp, Mc and the output terminal OUT. The other configurations of the regulator circuit 1*g* are the same as those of the regulator circuit 1*f*, and the description thereof will be omitted.

The regulator circuit 1*g* can achieve an effect equivalent to that of the regulator circuit 1*f*. Furthermore, the regulator circuit 1*g* can form a zero point between the amplifier A2, the resistive element Resr, and the on-chip capacitance, and can further improve the stability of the output voltage VDD.

As described above, the capless regulator circuit according to the above embodiment can accept a wide range of input voltages while achieving low power consumption.

Although the invention made by the inventor has been specifically described based on the embodiment, the present invention is not limited to the embodiment already described, and it is needless to say that various modifications can be made without departing from the gist thereof.

What is claimed is:

1. A regulator circuit comprising:

a power transistor that controls a supply of current to an external output terminal connected to a load;

a monitor transistor that is provided between the external output terminal and a reference voltage terminal to which a reference voltage is supplied, and through which a first current flows in accordance with a voltage of the external output terminal;

a first constant current source that is provided in series with the monitor transistor and generates a first voltage in accordance with a difference between the first current and a first constant current; and a cascode circuit that generates a second voltage by amplifying the first voltage and supplies it to a gate of the power transistor, wherein the power transistor is a P-channel MOS transistor, wherein the monitor transistor is a P-channel MOS transistor, wherein the cascode circuit includes a first transistor which is a P-channel MOS transistor to which the first voltage is supplied at a gate of the first transistor and the reference voltage is supplied at a drain of the first transistor, a second transistor which is an N-channel MOS transistor provided in series with the first transistor and to which a predetermined voltage is supplied at a gate of the second transistor, and a second constant current source which is provided in series with the first and second transistors and outputs a second constant current, and wherein the cascode circuit generates the second voltage in accordance with the second constant current and resistance values of the first and second transistors.

2. The regulator circuit according to claim 1, wherein the first transistor has a gate oxide film thickness thinner than that of a gate oxide film of the power transistor.

3. The regulator circuit according to claim 2, wherein the monitor transistor has a gate oxide film thickness thinner than that of the gate oxide film of the power transistor.

4. The regulator circuit according to claim 1, wherein the monitor transistor has a gate oxide film thickness thinner than that of a gate oxide film of the power transistor.

5. The regulator circuit according to claim 1, wherein the second transistor is a depletion-type N-channel MOS transistor.

6. The regulator circuit according to claim 1, further comprising a first capacitive element provided between the source and drain of the monitor transistor.

7. The regulator circuit according to claim 6, further comprising a second capacitive element provided between the gate and source of the first transistor.

8. The regulator circuit according to claim 1, further comprising a capacitive element provided between the gate and source of the first transistor.

9. The regulator circuit according to claim 1, wherein the second constant current source is a resistive element.

10. The regulator circuit according to claim 1, further comprising an amplifier that generates a control voltage in accordance with a feedback voltage corresponding to the voltage of the external output terminal and the reference voltage, and supplies it to the gate of the monitor transistor.

11. The regulator circuit according to claim 10, wherein the amplifier is driven by the voltage of the external output terminal and is composed of a plurality of transistors having a gate oxide film thickness thinner than that of a gate oxide film of the power transistor.

12. The regulator circuit according to claim 11, further comprising a resistive element provided between the drain of the power transistor and the external output terminal.

* * * * *